(12) United States Patent
Maeda et al.

(10) Patent No.: US 10,551,192 B2
(45) Date of Patent: Feb. 4, 2020

(54) INERTIAL SENSOR

(71) Applicant: HITACHI AUTOMOTIVE SYSTEMS, LTD., Hitachinaka-shi, Ibaraki (JP)

(72) Inventors: Daisuke Maeda, Tokyo (JP); Heewon Jeong, Tokyo (JP); Masahide Hayashi, Hitachinaka (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 180 days.

(21) Appl. No.: 15/313,242

(22) PCT Filed: Apr. 8, 2015

(86) PCT No.: PCT/JP2015/060972
§ 371 (c)(1),
(2) Date: Nov. 22, 2016

(87) PCT Pub. No.: WO2015/178117
PCT Pub. Date: Nov. 26, 2015

(65) Prior Publication Data
US 2017/0191830 A1 Jul. 6, 2017

(30) Foreign Application Priority Data
May 23, 2014 (JP) .................................. 2014-107589

(51) Int. Cl.
*G01C 19/5726* (2012.01)
*G01C 19/5755* (2012.01)
*G01P 15/18* (2013.01)
(Continued)

(52) U.S. Cl.
CPC ..... *G01C 19/5726* (2013.01); *G01C 19/5755* (2013.01); *G01C 19/5769* (2013.01);
(Continued)

(58) Field of Classification Search
CPC ............ G01C 19/5726; G01C 19/5776; G01C 19/5769; G01C 19/5755; G01P 15/097; G01P 15/125; G01P 15/18
See application file for complete search history.

(56) References Cited

U.S. PATENT DOCUMENTS 4,851,080 A * 7/1989 Howe ................. G01P 15/0802
438/53
5,233,874 A 8/1993 Putty et al.
(Continued)

FOREIGN PATENT DOCUMENTS

JP 06-160421 A 6/1994
JP 2007-501938 A 2/2007
(Continued)

OTHER PUBLICATIONS

The Extended European Search Report dated Dec. 15, 2017 for the European Application No. 15796172.3.

*Primary Examiner* — Xin Y Zhong
(74) *Attorney, Agent, or Firm* — Volpe and Koenig, P.C.

(57) ABSTRACT

An inertial sensor having a simple configuration by vacuum sealing a resonator which detects acceleration and exploits a resonance vibration using a high Q value MEMS device. The sensor includes: a detecting proof mass and beam which detects acceleration; a driving electrode which excites the detecting proof mass and beam; a resonant frequency tuning electrode which changes the resonant frequency of the detecting proof mass and beam; and a detecting circuit which applies voltage to the resonant frequency tuning electrode for changing the resonant frequency to cancel a change of the resonant frequency of the detecting proof mass and beam when the acceleration is applied to the detecting proof mass and beam during the vibration of the detecting proof mass and beam by the voltage applied to the detecting
(Continued)

proof mass and beam, and outputs the acceleration based on a value of the voltage applied to resonant frequency tuning electrode.

10 Claims, 9 Drawing Sheets

(51) Int. Cl.
*G01C 19/5769* (2012.01)
*G01P 15/097* (2006.01)
*G01C 19/5776* (2012.01)
*G01P 15/125* (2006.01)

(52) U.S. Cl.
CPC ........ *G01C 19/5776* (2013.01); *G01P 15/097* (2013.01); *G01P 15/125* (2013.01); *G01P 15/18* (2013.01)

(56) References Cited

U.S. PATENT DOCUMENTS

| 5,780,742 | A | 7/1998 | Burns et al. |
|---|---|---|---|
| 5,914,553 | A | 6/1999 | Adams et al. |
| 9,146,253 | B2 | 9/2015 | Aono et al. |
| 2008/0196500 | A1 | 8/2008 | Mendard et al. |
| 2008/0236280 | A1 | 10/2008 | Johnson et al. |
| 2009/0315645 | A1* | 12/2009 | Watanabe .......... H03H 9/02409 333/186 |
| 2011/0100126 | A1* | 5/2011 | Jeong ................. G01C 19/5719 73/514.32 |
| 2012/0111120 | A1 | 5/2012 | Brand et al. |
| 2014/0130596 | A1 | 5/2014 | Nakamura et al. |
| 2014/0208823 | A1* | 7/2014 | Trusov .................... G01P 21/00 73/1.38 |

FOREIGN PATENT DOCUMENTS

| JP | 2008-122371 A | 5/2008 |
|---|---|---|
| JP | 2011-185828 A | 9/2011 |
| JP | 2011-242371 A | 12/2011 |
| WO | 2009/050813 A1 | 4/2009 |
| WO | 2013/002085 A1 | 1/2013 |
| WO | 2013/083534 A2 | 6/2013 |

\* cited by examiner

INERTIAL SENSOR

TECHNICAL FIELD

The present invention relates to an inertial sensor which detects acceleration, in particular to an inertial sensor which uses a principle of detecting application of acceleration by a change of a resonant frequency of a vacuum sealed vibration system.

BACKGROUND ART

There is a sensor as one application example of a device manufactured by using a micromachining technique of a semiconductor called MEMS (Micro Electro Mechanical Systems). In a MEMS type sensor, it is important to consider a manufacturing variation and a manufacturing cost and to achieve a high accuracy and highly stable detection of very small physical quantities.

A background technique of the present technical field is disclosed, for example in PTL 1. In PTL 1, in an acceleration sensor which uses a principle of detecting acceleration from a displacement of a MEMS resonator, in order to prevent a vibration around a resonant frequency of a vibration system, a technique which suppresses the vibration by sealing the resonator at an atmospheric pressure and damping the resonator.

Further, the background technique of the present technical field is disclosed in PTL 2. In PTL 2, an electric oscillation circuit is provided with a detecting element having a structure in which a capacitance is changed in accordance with application of acceleration, and an impedance converter circuit in which a combined impedance and an inductor are equivalent, and a technique which detects acceleration indirectly from a control amount which controls a constant of a circuit element to keep a resonant frequency of the electric oscillation circuit constant is disclosed. According to this, since a resonance circuit can be obtained without manufacturing an inductor which is difficult to integrate, the oscillation circuit can be easily integrated. With this, a detecting circuit which detects a capacitance change due to application of acceleration can be formed in a small size, and higher sensitivity due to a high quality coefficient (Q value) of the oscillation circuit can be obtained.

Further, the background technique of the present technical field is disclosed in PTL 3. In PTL 3, a technique in which a spring softening effect in a detecting element having a structure in which a capacitance is changed in accordance with application of acceleration is used for a threshold of operation of an airbag is disclosed.

CITATION LIST

Patent Literature

PTL 1: JP 2011-242371 A
PTL 2: WO 2009/050813 A1
PTL 3: U.S. Pat. No. 5,914,553 A

SUMMARY OF INVENTION

Technical Problem

In a structure disclosed in PTL 1 in which the acceleration sensor and the angular velocity sensor are provided in a single chip, in view of a manufacturing process, the resonator which detects the acceleration is preferable to be vacuum sealed in order to manufacture by a simple configuration. However, when the resonator which detects the acceleration is vacuum sealed as in this structure, a damping is not applied and therefore it is necessary to prevent a vibration resistant property from deteriorating.

Further, since a frequency of a clock of the oscillation circuit of the acceleration sensor is high and the Q value thereof is large, a circuit configuration in which a mechanical resonance of a crystal resonator is used is preferable. For example, in a configuration in which the Q value is obtained by using a resonance of the oscillation circuit itself as disclosed in PTL 2, it is difficult to obtain a high resonant frequency like the crystal resonator and the large Q value. Thus, in the acceleration sensor using an electric resonance as disclosed in PTL 2, stability of a zero point of output is insufficient.

Further, in PTL 3, a structure to vacuum seal the resonator which detects acceleration is not disclosed in view of a manufacturing process of the acceleration sensor.

A representative object of the present invention is to provide a technique of manufacturing a highly stable inertial sensor with a simple configuration by vacuum sealing a resonator which detects acceleration and exploiting a resonance vibration obtained from a MEMS device with a large Q value.

The aforementioned and other objects and novel features are understood by reading a description of the present application in conjunction with accompanying drawings.

Solution to Problem

Brief aspects of a representative invention disclosed in the present application are described as below.

A representative inertial sensor includes: a first resonator which detects acceleration; a capacitive first electrode which excites the first resonator; a capacitive second electrode which changes a resonant frequency of the first resonator; and a detecting circuit which applies voltage to the second electrode to change the resonant frequency such that a change of the resonant frequency of the first resonator is canceled when the acceleration is applied to the first resonator during a vibration of the first resonator due to application of voltage to the first resonator, and outputs the acceleration based on a value of the voltage applied to the second electrode.

More preferably, in the inertial sensor, bias voltage which changes the resonant frequency is applied in advance to the second electrode in a steady state in which the acceleration is not applied to the first resonator, and the resonant frequency of the first resonator in the steady state is to be a resonant frequency lower than that in a state in which the bias voltage is not applied.

Advantageous Effects of Invention

Effects of the representative invention disclosed in the present application are briefly described as below.

According to a representative effect, a highly stable inertial sensor with a simple configuration can be manufactured by vacuum sealing a resonator which detects acceleration and exploiting a resonance vibration obtained from a MEMS device with a large Q value.

DESCRIPTION OF EMBODIMENTS

Figure 1:
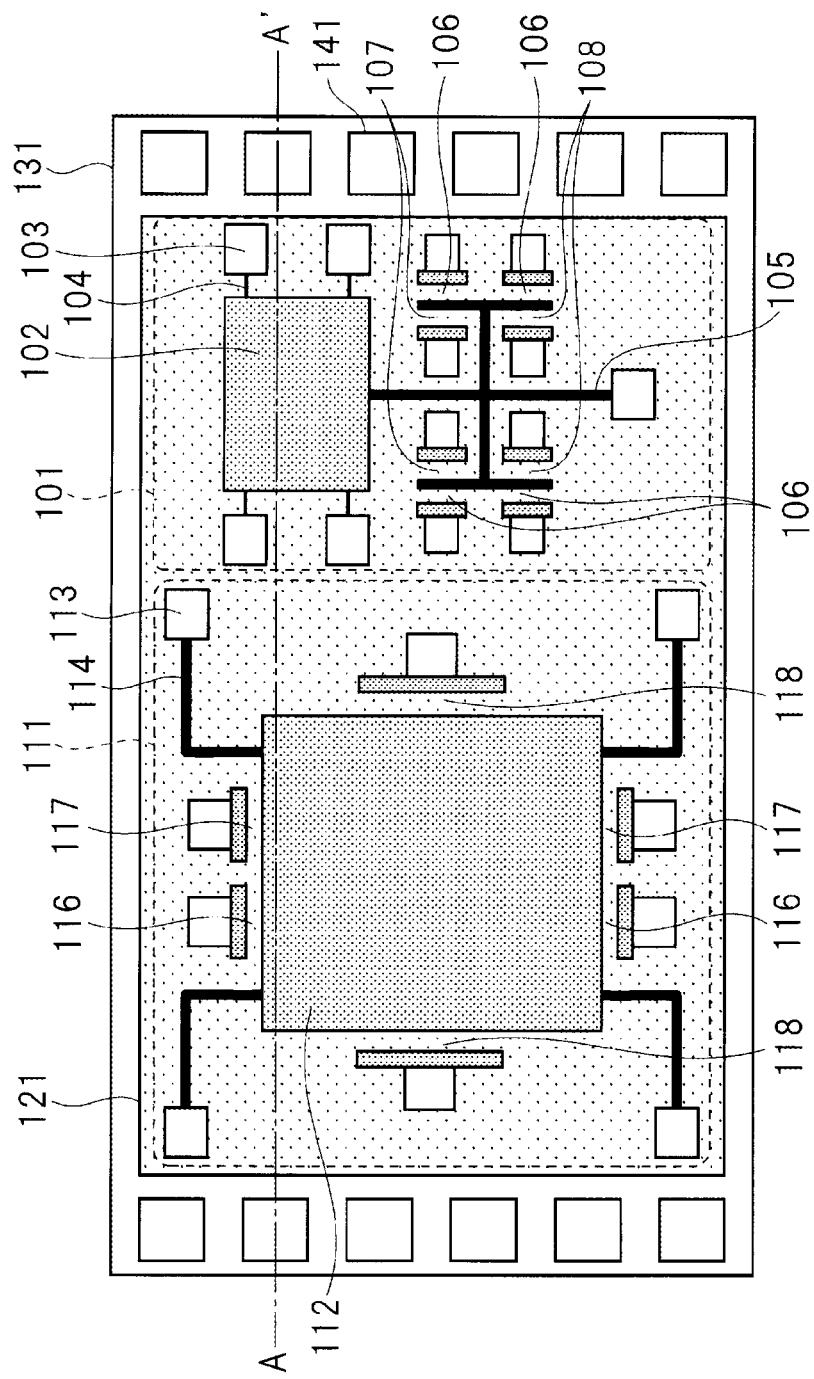
FIG. 1 is a plane view illustrating one example of a configuration of a detecting element of an inertial sensor according to an embodiment 1 of the present invention.

In embodiments described below, if necessary for convenience, the embodiment will be divided into a plurality of sections or embodiments in the description, however, excepting the case that is particularly demonstrated, these are not independent with each other, but are in a relationship in which one is a variation(s) of part or all of the other, a detailed description, a supplementary description, or the like. Further, in the embodiments described below, when the number of elements and the like (including the number, the numeric value, the quantity, the range, and the like) are cited, excepting the case that is particularly demonstrated, the case in which the embodiment is obviously limited in principle to the particular number, and the like, the embodiment is not limited to the particular number, but the number may be more than or less than the particular number.

Further, in embodiments described below, the components (including component steps and the like) are not necessarily required, excepting the case that is particularly demonstrated, the case in which the components are clearly required in principle, and the like. Further, in embodiments described below, when contours, positional relationships, and the like of the constituent components are cited, excepting the case that is particularly demonstrated, the case in which the components are obviously inappropriate in principle, and the like, it is assumed that those substantially approximate to or analogous to the contours or the like are included. This also applies to the numeric value and the range described above.

OUTLINE OF EMBODIMENTS

First, the outline of embodiments is described. In the outline of the embodiments, the description is made by attaching components or symbols in parentheses corresponding to those of the embodiments as an example.

A representative inertial sensor according to the embodiment has a first resonator (detecting proof mass and beam 105) which detects acceleration, a capacitive first electrode (driving electrode 106) which excites the first resonator, a capacitive second electrode (resonant frequency tuning electrode 108) which changes a resonant frequency of the first resonator, and a detecting circuit which applies voltage to the second electrode to change the resonant frequency such that a change of the resonant frequency of the first resonator is canceled when the acceleration is applied to the first resonator during a vibration of the first resonator due to application of voltage to the first resonator (frequency controlling part 433, DAC part 436), and outputs the acceleration based on a value of the voltage applied to the second electrode (CV converting part 430, ADC part 431, demodulation part 432, frequency controlling part 433, signal tuning part 435).

More preferably, in the inertial sensor, bias voltage which changes the resonant frequency is applied in advance to the second electrode in a steady state in which the acceleration is not applied to the first resonator, and the resonant frequency of the first resonator in the steady state is to be a resonant frequency lower than that in a state in which the bias voltage in not applied.

Hereinafter, each embodiment is described in detail based on the outline of the embodiments described above with reference to drawings. Further, the same members in all the drawings for describing the embodiments is denoted by the same symbol in principle, and the description thereof is not repeated. Further, in the embodiments described blow, the description of the same or a similar part is not repeated in principle excepting the case where necessary.

Further, in drawings used in the embodiment, the hatching may be omitted in a cross-sectional view so that the drawing can be seen easily. Further, the hatching may be added in a plane view so that the drawing can be seen easily.

In the present embodiment, an inertial sensor in which an acceleration detecting element and an angular velocity detecting element are sealed in one cavity (also described as chamber) of one chip is described as one example. For example, in an embodiment 1, an example of the inertial sensor in which one acceleration detecting element and one angular velocity detecting element are sealed in one cavity of one chip is described. Further, in an embodiment 2, an example of the inertial sensor in which three acceleration detecting elements and one angular velocity detecting element are sealed in one cavity of one chip is described.

However, the present invention is not limited to this, and may be applied to an inertial sensor in which only acceleration detecting element is sealed in one cavity of one chip. In this case, the number of the acceleration detecting elements is not limited to one, and more than two acceleration detecting elements may be provided. Further, the present invention may be applied to an inertial sensor in which a plurality of acceleration detecting elements and a plurality of angular velocity detecting elements are sealed in one cavity of one chip.

Embodiment 1

An inertial sensor provided with an acceleration sensor and an angular velocity sensor according to an embodiment 1 is described with reference to FIGS. 1 to 7. Each of the acceleration sensor and the angular velocity sensor of the inertial sensor has a mechanical part of a detecting element and a circuit part of a detecting circuit.

Detecting Element of Inertial Sensor

First, a configuration of the detecting element of the inertial sensor according to the embodiment 1 is described with reference to FIGS. 1 and 2. FIG. 1 is a plane view illustrating one example of the configuration of the detecting element of the inertial sensor. FIG. 1 illustrates the whole configuration of the detecting element of the inertial sensor provided with an acceleration detecting element and an angular velocity detecting element.

In the embodiment 1, as one example, a configuration example of the inertial sensor in which two detecting elements of acceleration in one axial direction or an acceleration detecting element 101 and angular velocity in one axial direction or an angular velocity detecting element 111 are vacuum sealed in one cavity (chamber) 121 of one chip 131.

The acceleration detecting element 101 has a proof mass 102, a fixed part 103, a beam 104, a detecting proof mass and beam 105, a driving electrode 106, a monitoring electrode 107, and a resonant frequency tuning electrode 108. The proof mass 102 is supported by the beam 104 from the fixed part 103. The detecting proof mass and beam 105 is connected to the proof mass 102 and supported from the fixed part 103. The detecting proof mass and beam 105 is formed as a resonator which detects acceleration. The driving electrode 106 is formed as a capacitive electrode which excites the detecting proof mass and beam 105. The monitoring electrode 107 is formed as a capacitive electrode which detects a vibration of the detecting proof mass and beam 105. The resonant frequency tuning electrode 108 is formed as a capacitive electrode which changes a resonant frequency of the detecting proof mass and beam 105.

The angular velocity detecting element 111 has a detecting proof mass 112, a fixed part 113, a beam 114, a driving electrode 116, a monitoring electrode 117, and a detecting electrode 118. The detecting proof mass 112 is supported by the beam 114 from the fixed part 113. The detecting proof mass 112 is formed as a resonator which detects angular velocity. The driving electrode 116 is formed as a capacitive electrode which excites the detecting proof mass 112. The monitoring electrode 117 is formed as a capacitive electrode which detects a vibration of the detecting proof mass 112. The detecting electrode 118 is formed as a capacitive electrode which detects application of the angular velocity.

Figure 3:
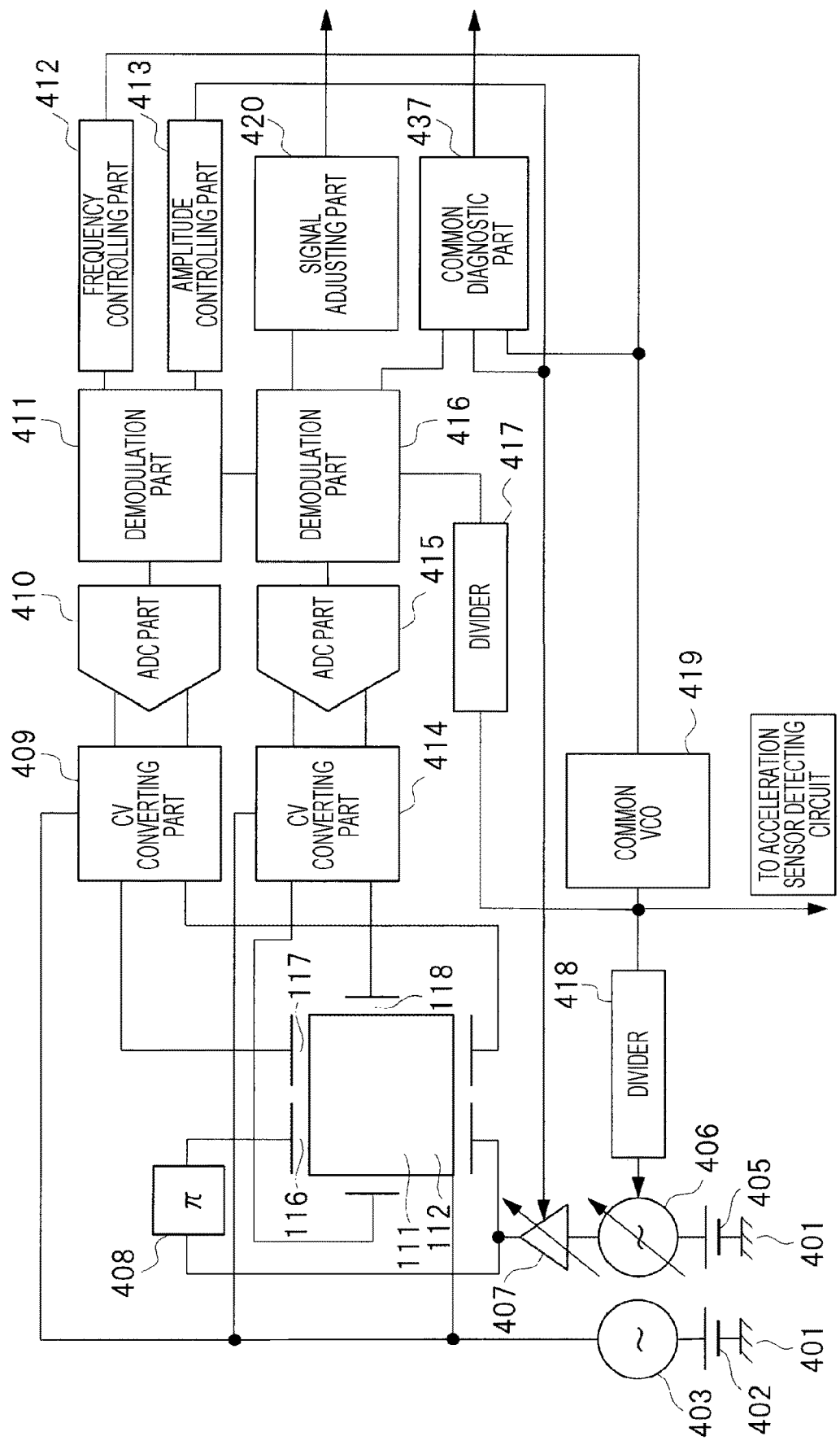
FIG. 3 is a block diagram illustrating one example of a configuration of a detecting circuit of an angular velocity detecting element in the inertial sensor according to the embodiment 1 of the present invention.
Figure 5:
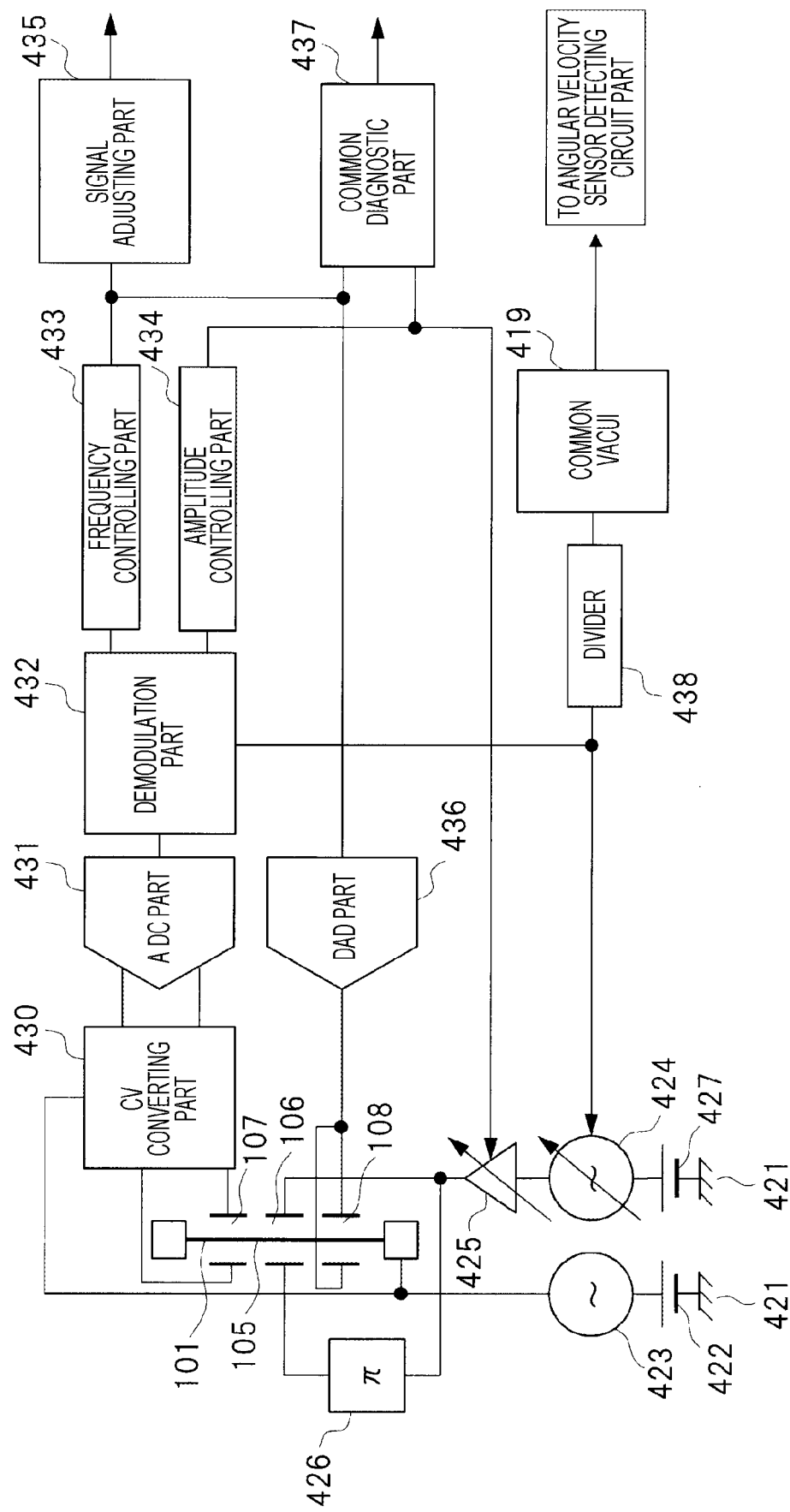
FIG. 5 is a block diagram illustrating one example of a configuration of a detecting circuit of an acceleration detecting element in the inertial sensor according to the embodiment 1 of the present invention.

A pad 141 which exchanges an electric signal with the outside is arranged on a surface of the chip 131 in which the acceleration detecting element 101 and the angular velocity detecting element 111 are vacuum sealed in the cavity 121. The pad 141 is electrically connected to a pad such as a chip forming the detecting circuit (a detecting circuit of the acceleration sensor is shown in FIG. 5 and a detecting circuit of the angular velocity sensor is shown in FIG. 3, both of which are described below) of the acceleration sensor and the angular velocity sensor via a bonding wire.

Figure 2:
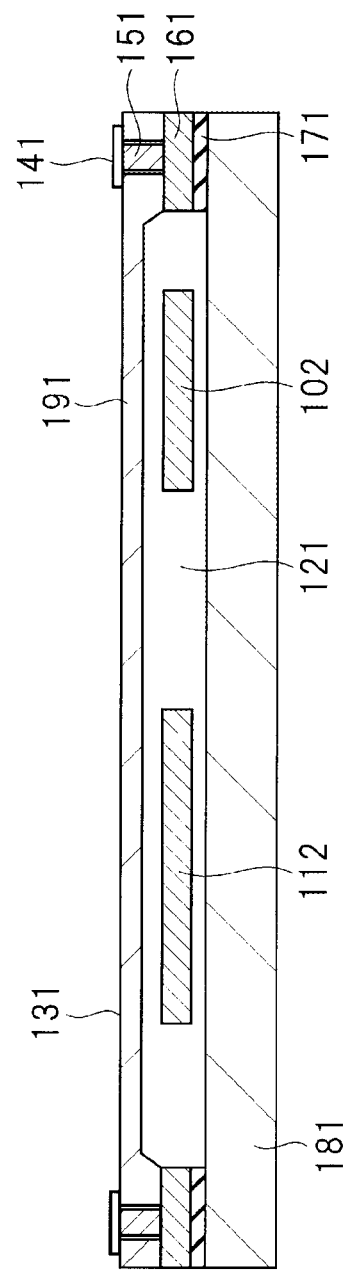
FIG. 2 is a cross-sectional view illustrating one example of the configuration of the detecting element of the inertial sensor shown in FIG. 1.

FIG. 2 is a cross-sectional view illustrating one example of the configuration of the detecting element of the inertial sensor shown in FIG. 1. FIG. 2 illustrates a cross section of the chip 131 taken by a part (A-A' line) of the proof mass 102 of the acceleration detecting element 101 and the detecting proof mass 112 of the angular velocity detecting element 111 shown in FIG. 1.

The chip 131 is provided with a handle layer 181, an insulation layer 171, a device layer 161, and a cap layer 191. The chip 131 is made of, for example, a SOI (Silicon On Insulator) substrate. Here, the handle layer 181, the insulation layer 171 and the device layer 161 are made of the SOI substrate, and the acceleration detecting element 101 and the angular velocity detecting element 111 are formed by processing the device layer 161.

Further, the detecting elements 101, 111, which are formed by the device layer 161, and the pad 141, which exchanges the electric signal with the outside, are electrically connected by a penetrating electrode 151 formed in the cap layer 191. Further, the cavity 121 is vacuum sealed by the cap layer 191, the device layer 161, the insulation layer 171 and the handle layer 181. In the cavity 121, the proof mass 102 of the acceleration detecting element 101 and the detecting proof mass 112 of the angular velocity detecting element 111 can be excited.

In the embodiment 1, the acceleration detecting element 101 and the angular velocity detecting element 111 are formed in the cavity 121 which is only one cavity formed in the chip 131. Further, the acceleration detecting element 101 and the angular velocity detecting element 111 are vacuum sealed in the cavity 121.

Angular Velocity Sensor

FIG. 3 is a block diagram illustrating one example of a configuration of the detecting circuit of the angular velocity detecting element 111 in the inertial sensor according to the present embodiment. FIG. 3 illustrates one example of the configuration of the detecting circuit which detects a displacement due to application of angular velocity of the angular velocity detecting element 111 and outputs the detected angular velocity to the outside.

The detecting circuit shown in FIG. 3 has a function of detecting (i) a driving of the resonator (the detecting proof mass 112) for detecting the angular velocity from a change of the capacitance of the electrode provided in the angular velocity detecting element 111 and (ii) a vibration of the resonator due to the application of the angular velocity. In FIG. 3, components of the angular velocity detecting element 111 (the detecting proof mass 112, the driving electrode 116, the monitoring electrode 117, the detecting electrode 118), which are necessary to describe the detecting circuit, are also illustrated.

The detecting circuit has a reference electric potential 401, a DC voltage generating part 402, an alternating voltage generating part 403, a DC voltage generating part 405, an alternating voltage generating part 406, an amplifier 407, a phase inverter 408, a CV (Capacitor to Voltage) converting part 409, an ADC (Analogue to Digital Converter) part 410, a demodulation part 411, a frequency controlling part 412, an amplitude controlling part 413, a CV converting part 414, an ADC part 415, a demodulation part 416, a divider 417, a divider 418, a common VCO (Voltage Controlled Oscillator) 419, a signal tuning part 420, and a common diagnostic part 437.

Here, a circuit including all of those components is described as the detecting circuit of the angular velocity detecting element 111, however it is not limited to this, and a part of function may be included in an external circuit. For example, since the common VCO 419 or the common diagnostic part 437 may be formed to be common to the detecting circuit of the acceleration detecting element 101, a common circuit including these components may be independently formed.

In the angular velocity detecting element 111, the detecting proof mass 112 supported by the beam 114 from the fixed part 113 is excited in a driving direction at constant amplitude by an alternating signal applied to the driving electrode 116 at a resonant frequency defined by the beam 114 and the detecting proof mass 112 and a sealing pressure of the cavity 121. Here, the driving direction denotes a direction of a displacement generated by the driving electrode 116, and it is a vertical direction in FIG. 1.

The frequency of the vibration in the driving direction is not necessarily the resonant frequency, however in view of maximizing efficiency of voltage against amplitude, it is preferable to be vibration at the resonant frequency.

Here, the driving signal (voltage) which excites the vibration and is applied to the driving electrode 116 is formed by two driving signals having different phases at 180 degrees. The two driving signals are generated by the DC voltage generating part 405 against the reference electric potential 401, the alternating voltage generating part 406, the amplifier 407, and the phase inverter 408 which generates voltage having an opposite phase.

Further, the frequency of the alternating voltage generated in the alternating voltage generating part 406 is formed as a frequency obtained by dividing or multiplying a frequency of an oscillation signal generated by the common VCO 419, which is common to the detecting circuit of the acceleration detecting element 101 as described below, by the divider 418. However, the original frequency without passing the divider 418 may be adopted, and the common VCO 419 may be formed by an oscillation circuit capable of controlling the frequency without controlling voltage.

The two alternating driving signals generated by the phase inverter 408 are applied respectively to the driving electrodes 116 facing each other, and the detecting proof mass 112 is excited in an excitation direction in accordance with the frequency of the alternating signal of the driving signal applied to the detecting proof mass 112.

Further, a change of capacitance of the monitoring electrode 117 due to the vibration is converted to voltage in the CV converting part 409 and further converted to a digital value via the ADC part 410, and then signal processing is performed in a digital region.

Here, a principle of detecting a change of a capacitance component of the monitoring electrode 117 by converting to voltage in the CV converting part 409 is described. In the CV converting part 409, it is not limited to the monitoring electrode 117, and in order to detect the change of the capacitance, a carrier signal (voltage) generated in the DC voltage generating part 402 against the reference electric potential 401 and the alternating voltage generating part 403 is applied to the detecting proof mass 112 of the angular velocity detecting element 111.

A current voltage conversion by a sampling while synchronizing with the carrier signal is performed in the CV converting part 409, and therefore the capacitance component excluding a carrier component is detected as a voltage signal.

Figure 4:
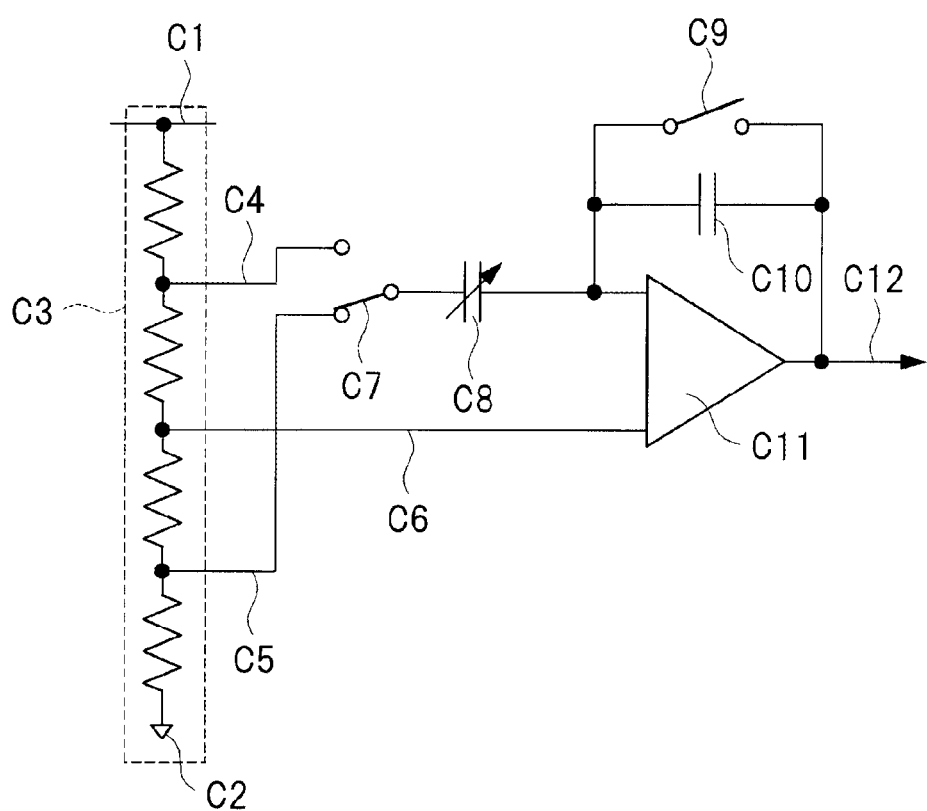
FIG. 4 is a circuit diagram illustrating one example of a switched capacitor type CV converting circuit in a CV converting part of the detecting circuit shown in FIG. 3.

Specifically, the CV converting part 409 is formed by a CV converting circuit shown in FIG. 4. FIG. 4 is a circuit diagram illustrating one example of a switched capacitor type CV converting circuit. The CV converting circuit has a reference voltage generating part C3, a carrier generating switch C7, a feedback switch C9, a feedback capacitance C10, and an operational amplifier C11. C8 denotes a capacitance to be detected. The reference voltage generating part C3 outputs a carrier HIGH signal C4 (Vh), a carrier LOW signal C5 (Vl), and a carrier intermediate voltage C6 (Vb) based on reference voltage C1 and reference voltage C2.

The CV converting circuit has the reference voltage generating part C3, and by switching the carrier generating switch C7, an alternating signal provided with the carrier HIGH signal C4 and the carrier LOW signal C5 is applied as a carrier signal to the capacitance C8 (C) to be detected.

With this operation, charge defined by Q=C (Vh−Vl) is held in C10 against the capacitance C of the capacitance C8 to be detected.

Here, a clock of the carrier generating switch C7 may be or may not be synchronized with the common VCO 419, however as taking a cost in manufacturing a plurality of VCOs into consideration, it is preferable that the clock is generated by dividing or multiplying the common VCO 419.

Next, the carrier intermediate voltage C6 is applied as a bias to the operational amplifier C11, and a circuit in which the feedback capacitance C10 (Cf) and the feedback switch C9 are arranged is formed, and ON/OFF operation is performed while synchronizing the carrier generating switch C7. With this operation, voltage represented by V=(C/Cf)×(Vh−Vl)+Vb is generated in an output part C12.

In this way, detecting the capacitance C8 in a high frequency signal band by using the carrier signal leads to a high quality capacitance detection while avoiding a noise component such as 1/F noise in a low band. However, since this configuration is not necessarily required in the present invention, a circuit which converts the capacitance component to voltage by using a detecting circuit other than the switched capacitor type circuit may be used. For example, a detecting method in a continuous time which uses TIA (Trans Impedance Amplifier) may be adopted.

Next, signal processing after the CV converting processing in the CV converting part 409 is described. Here, the signal processing described below is performed in a digital signal region after passing the ADC part 410, however the signal processing may be performed in an analogue region before passing the ADC part 410. Further, a configuration of the ADC part 410 having an arbitrary type such as ΣΔ type, SAR (Successive Approximation Register) type or the like may be adopted in the present embodiment.

A monitoring signal (a voltage signal showing a displacement amount of the detecting proof mass 112 detected by the monitoring electrode 117) passed through the ADC part 410 performs demodulation processing in the demodulation part 411.

The alternating signal used in the synchronization detection of the monitoring signal in the demodulation part 411 has a frequency generated by dividing or multiplying a frequency of the oscillation signal generated in the common VCO 419 by the divider 417.

A divided ratio in the divider 417 is generally the same as that of the divider 418 of the driving signal. Thus, the divider 418 and the divider 417 may be formed by a single circuit or hardware.

In the demodulation part 411, a phase component of the monitoring signal and an amplitude component of the monitoring signal are detected. First, the phase component is the basis of a control input for keeping a vibration in the resonant frequency in the driving direction of the detecting proof mass 112.

Generally, when a vibration system (detecting element) represented by a second order lag system is excited in the resonant frequency, its displacement is delayed by 90 degrees against the driving signal. Namely, by controlling the common VCO 419 to keep a state in which the monitoring signal is delayed by 90 degrees against the driving signal, the vibration in the resonant frequency can be kept.

Specifically, by multiplying a detecting signal in which a phase is shifted by 90 degrees against the monitoring signal with the monitoring signal and further applying LPF (Low Pass Filter), a phase shift component is obtained from a signal in which the phase is delayed by 90 degrees against the monitoring signal based on the product-to-sum of the trigonometric function. The phase shift component obtained in the demodulation part 411 is given to the frequency controlling part 412 as a control input.

In the frequency controlling part 412, in a case in which the frequency of the driving signal is higher than the resonant frequency of the detecting proof mass 112 in the driving direction, a control input is given to the common VCO 419 such that the oscillation frequency of the common VCO 419 is to be decreased, and in an opposite case, the control input is given to the common VCO 419 such that the oscillation frequency of the common VCO 419 is to be increased.

Further, the amplitude component of the monitoring signal, which is the second detecting component of the demodulation part 411, denotes the amplitude of the vibration in the driving direction. Coriolis force (Fc) generated in the detecting proof mass 112 by the application of the angular velocity is defined by $Fc=2 \cdot m \cdot \Omega \cdot Vx$. Here, m denotes mass of the detecting proof mass 112, $\Omega$ denotes the applied angular velocity, and Vx denotes a moving velocity of the detecting proof mass 112 in the driving direction.

In a case in which the frequency of the vibration is constant, it is recognized from the formula described above that the Coriolis force which reflects the applied angular velocity is in proportion to the amplitude of the detecting proof mass 112 in the driving direction, and therefore unless the vibration in the driving direction has a constant velocity or a constant amplitude, the Coriolis force obtained by the angular velocity $\Omega$ is deviated. This means that the sensitivity of the angular velocity sensor is deviated, and therefore it is necessary to keep the amplitude in the driving direction constant.

In order to obtain the amplitude component of the monitoring signal, it is necessary that the detecting signal having the same phase as the monitoring signal input to the demodulation part 411 is multiplied with the monitoring signal and the LPF is applied. Namely, the phase of the detecting signal is different from that of the detecting signal for obtaining the phase component described above. Thus, the detecting signal for obtaining the amplitude is generated (phase is delayed) in the demodulation part 411, and the synchronization detection is performed. Here, the signal generation may be performed in any part in the detecting circuit.

The amplitude component obtained in the demodulation part 411 is sent to the control input of the amplitude controlling part 413. In the amplitude controlling part 413, present amplitude obtained from the amplitude component of the monitoring signal is compared with a predetermined target amplitude, and a control that in a case in which the present amplitude is less than the target amplitude, gain of the amplifier 407 is increased, and in an opposite case, the gain of the amplifier 407 is decreased is performed.

By performing the two controls described above by the monitoring signal which detects the vibration of the detecting proof mass 112 in the driving direction, the angular velocity sensor according to the present embodiment can keep the vibration in the resonant frequency in the driving direction and also keep the amplitude constant.

Next, a step of detecting the applied angular velocity by the angular velocity detecting element 111 is described. The detecting proof mass 112 supported by the beam 114 from the fixed part 113 has the resonant frequency of the vibration in a detecting direction defined by the beam 114, the detecting proof mass 112, and the sealing pressure of the cavity 121. Here, the detecting direction denotes a direction orthogonal to the driving direction of the vibration, and denotes a lateral direction in FIG. 1.

Here, a relationship between the resonant frequency in the driving direction and the resonant frequency in the detecting direction is arbitrary.

Next, as described above, in a case in which the vibration having the constant amplitude and the constant frequency in the driving direction is generated, since the Coriolis force is generated in a direction orthogonal to the driving direction by the applied angular velocity, the detecting proof mass 112 is excited in the detecting direction orthogonal to the driving direction or in a direction in which the capacitance of the detecting electrode 118 is changed.

The change of the capacitance generated in the detecting electrode 118 which detects the vibration in the detecting direction is converted into voltage in the CV converting part 414 and then converted into the digital value via the ADC part 415, and the signal processing is performed in the digital region.

Here, the principle of detecting the change of the capacitance component of the detecting electrode 118 in the CV converting part 414 by converting into voltage is the same as the principle of detecting of the capacitance component of the monitoring electrode 117. Further, the carrier signal generated in the DC voltage generating part 402 against the reference electric potential 401 and the alternating voltage generating part 403 applied to the detecting proof mass 112 for detecting the change of the capacitance of the monitoring electrode 117 is also used as a carrier for a CV conversion of the detecting electrode 118.

Next, the signal processing after the CV converting processing in the CV converting part 414 is described. The detecting signal passed through the ADC part 415 performs the demodulation processing which extracts the amplitude component of the detecting signal in the demodulation part 416. The alternating signal used for the synchronization detection of the detecting signal in the demodulation part 416 is a signal having a frequency obtained by dividing or multiplying the frequency of the oscillation signal generated in the common VCO 419 by the divider 417.

The principle of obtaining the amplitude by the demodulation processing is the same as that described in the synchronization detection for the driving amplitude control, and therefore the description thereof is omitted.

The amplitude component of the detecting electrode 118 obtained in the demodulation part 416 is in proportion to the applied angular velocity. The signal component may be used as the angular velocity output of the sensor, however in the signal tuning part 420, it is generally output to the outside of the sensor after a zero point correction, a sensitivity correction or a correction of those changes (temperature characteristics) due to a temperature is performed.

Further, in the angular velocity sensor, in order to detect a change of the resonant frequency or a change of the sealing pressure due to the break of the mechanical part of the angular velocity detecting element 111, or a failure of the sensor due to an electric grounding or an electric opening of the circuit part of the detecting circuit, the common diagnostic part 437 is arranged. A detailed operation of the common diagnostic part 437 is described below.

Acceleration Sensor

FIG. 5 is a block diagram illustrating one example of a configuration of the detecting circuit of the acceleration detecting element 101 in the inertial sensor according to the present embodiment. FIG. 5 illustrates one example of the configuration of the detecting circuit which detects a displacement of the acceleration detecting element 101 due to application of the acceleration and outputs the detected acceleration to the outside.

The detecting circuit shown in FIG. 5 has a function of driving the resonator (the detecting proof mass and beam 105) for detecting the acceleration from a change of a capacitance of an electrode arranged in the acceleration detecting element 101 or detecting a change of the vibration of the resonator due to application of the acceleration. In FIG. 5, components of the acceleration detecting element 101 (the detecting proof mass and beam 105, the driving electrode 106, the monitoring electrode 107, the resonant frequency tuning electrode 108), which are necessary to describe the detecting circuit, are also illustrated.

The detecting circuit has a reference electric potential 421, a DC voltage generating part 422, an alternating voltage generating part 423, an alternating voltage generating part 424, an amplifier 425, a phase inverter 426, a DC voltage generating part 427, a CV converting part 430, an ADC part 431, a demodulation part 432, a frequency controlling part 433, an amplitude controlling part 434, a signal tuning part 435, a DAC part 436, the common diagnostic part 437, a divider 438, and the common VCO 419. The common VCO 419 and the common diagnostic part 437 are common to the detecting circuit of the angular velocity detecting element 111.

In the acceleration detecting element 101, the detecting proof mass and beam 105 supported from the fixed part 103 is excited by an alternating signal applied to the driving electrode 106 in the driving direction at constant amplitude in a resonant frequency defined by the detecting proof mass and beam 105 and the sealing pressure of the cavity 121. Here, the detailed frequency of the vibration in the driving direction is described below, however it is not necessarily the resonant frequency.

Here, the voltage which excites the vibration and is applied to the driving electrode 106 is formed by two driving signals having different phases at 180 degrees. The two driving signals are generated by the DC voltage generating part 427 against the reference electric potential 421, the alternating voltage generating part 424, the amplifier 425, and the phase inverter 426 which generates voltage having an opposite phase. Further, the frequency of the alternating voltage generated in the alternating voltage generating part 424 is formed as a frequency obtained by dividing or multiplying a frequency of an oscillation signal generated by the common VCO 419 which is common to the detecting circuit of the angular velocity detecting element 111 by the divider 438.

Further, the frequency of the alternating voltage generated in the alternating voltage generating part 424 may be formed by the original output frequency of the common VCO 419 without passing the divider 438.

The two alternating driving signals generated by the phase inverter 426 are applied respectively to the driving electrodes 106 facing each other, and the detecting proof mass and beam 105 is excited in the driving direction in accordance with the frequency of the alternating signal of the driving signal applied to the detecting proof mass and beam 105. The driving direction is a lateral direction of FIG. 1.

Further, a change of capacitance of the monitoring electrode 107 due to the vibration is converted to voltage in the CV converting part 430 and further converted to a digital value via the ADC part 431, and then signal processing is performed in a digital region.

Here, a principle of detecting a change of a capacitance component of the monitoring electrode 107 by converting to voltage in the CV converting part 430 is described above in the description for the CV converting part 409. However, the carrier signal generated in the DC voltage generating part 422 against the reference electric potential 421 and the alternating voltage generating part 423 is not necessarily the same as that used in the detecting circuit of the angular velocity detecting element 111, and different carrier signal or bias voltage may be used for the acceleration detecting element 101. Similarly, the frequency of the alternating voltage applied as the carrier may be special to the acceleration detecting element 101. For example, in order to decrease the carrier frequency for saving consumption electricity, a circuit configuration in which the carrier frequency is decreased may be adopted.

Next, signal processing after the CV converting processing in the CV converting part 430 is performed in the digital signal region after passing the ADC part 431 similarly to the angular velocity detecting element 111, however the signal processing described below may be performed in an analogue region before passing the ADC part 431.

A monitoring signal (a voltage signal showing a displacement of the detecting proof mass and beam 105 detected by the monitoring electrode 107) passing the ADC part 431 performs demodulation processing in the demodulation part 432. The alternating signal used in the synchronization detection of the monitoring signal in the demodulation part 432 has the same frequency as a frequency of the driving signal generated by dividing or multiplying the frequency of the oscillation signal generated in the common VCO 419, which is common to the detecting circuit of the angular velocity detecting element 111, by the divider 438. The divided ratio in the divider 438 (corresponds to the divider 417 in FIG. 3) is the same as that in the divider 418 (FIG. 3) of the driving signal. Thus, as the divider 438, the divider 418 and the divider 417 are illustrated by the same circuit or hardware, however they may be provided by difference dividers. For example, in a case in which a demodulation configuration in which analogue voltage is given to the alternating voltage generating part 424 and only a digital sign inverting signal is given to the demodulation part 432 is provided, the divider 438 is mounted by different hardware.

In the demodulation part 432, a phase component of the monitoring signal and an amplitude component of the monitoring signal are detected. Each detecting principle is the same as that described in the description of the detecting circuit of the angular velocity detecting element 111. However, an object of the phase component detection of the monitoring signal performed here is different from that of the angular velocity detecting element 111.

In the acceleration detecting element 101, by detecting a change of the resonant frequency of the detecting proof mass and beam 105 in the driving direction, the applied acceleration is obtained indirectly. It is based on a principle that when the proof mass 102 is displaced by application of the acceleration, inner stress of the detecting proof mass and beam 105 in the displacement direction or normal stress of the beam 104 is changed.

As shown in FIG. 1, the proof mass 102 is supported from the beam 104, and since the beam 104 is formed such that the stiffness of the beam 104 in a normal stress direction of the detecting proof mass and beam 105 (vertical direction in FIG. 1=detecting direction) is small and the stiffness in an orthogonal direction thereof is large, the beam 104 is displaced only by the application of the acceleration in the normal stress direction of the detecting proof mass and beam 105, and therefore the normal stress of the detecting proof mass and beam 105 is changed.

Specifically, in a case in which the displacement occurs in a direction in which the normal stress is increased, the resonant frequency defined by the detecting proof mass and beam 105 and the sealing pressure is increased, and in a case of the displacement in an opposite direction, the resonant frequency is decreased. Namely, by detecting a change of the resonant frequency of the detecting proof mass and beam 105, the acceleration applied to the proof mass 102 can be detected indirectly.

However, a configuration in which the VCO which is different from the detecting circuit of the angular velocity detecting element 111 is provided in the detecting circuit of the acceleration detecting element 101 in order to make the frequency of the driving signal follow the resonant frequency of the vibration system (detecting element) needs a plurality of the oscillators arranged in an integrated circuit, and therefore this configuration causes an increase of a cost of the detecting circuit.

Accordingly, in the present embodiment, the applied acceleration is detected indirectly by using a control output which performs not to detect the change of the resonant frequency of the detecting proof mass and beam 105 but to keep always the resonant frequency of the detecting proof mass and beam 105 constant.

In the configuration described above, the alternating signal output from the common VCO 419 which is common to that in the detecting circuit of the angular velocity detecting element 111 is used as a driving signal applied to the detecting proof mass and beam 105. More specifically, an oscillation frequency of the acceleration detecting element 101 is matched with the resonant frequency of the angular velocity detecting element 111 in the driving direction or a divided or multiplied frequency thereof. With such a configuration, the alternating signal output from the common VCO 419 which is common to that in the detecting circuit of the angular velocity detecting element 111 can be used for the driving signal applied to the detecting proof mass and beam 105.

In order to perform the control in which the resonant frequency of the detecting proof mass and beam 105 is kept constant, in the acceleration detecting element 101, the resonant frequency tuning electrode 108 that uses an spring softening effect is arranged. By applying DC voltage Vs to the resonant frequency tuning electrode 108, a decreasing effect of a spring constant (stiffness of the spring is to be softer) represented by $\Delta k = \varepsilon \times S \times Vs^2/g^3$ can be obtained. Here, ε denotes a dielectric constant, S denotes a facing area of a parallel flat type electrode, and g denotes a facing gap of the parallel flat type electrode.

As shown in the formula described above, the spring softening effect is generated only to decrease the spring constant regardless of whether the voltage is positive or negative. Thus, a predetermined DC voltage as bias voltage is applied in advance to the resonant frequency tuning electrode 108 which causes the spring softening effect in a steady state in which the acceleration is not applied. In this case, the spring is to be harder (resonant frequency is increased) than its original state by decreasing the DC voltage, and the spring is to be softer (resonant frequency is decreased) than its original state by increasing the DC voltage.

Further, the monitoring electrode 107 or the driving electrode 106 may have a function of the resonant frequency tuning electrode 108. In this case, the DC voltage applied to the monitoring electrode 107 or the driving electrode 106 causes the resonant frequency tuning function. This configuration eliminates the need for providing the resonant frequency tuning electrode 108, and achieves a decrease of an area of the acceleration detecting element 101 or a low production cost.

As described above, in the vibration system of the detecting proof mass and beam 105, similarly to the vibration system of the angular velocity detecting element 111, when the detecting proof mass and beam 105 is excited in the resonant frequency, a displacement delayed by 90 degrees against the driving signal is generated. Namely, by performing a voltage control of the resonant frequency tuning electrode 108 such that the monitoring signal is kept to be delayed by 90 degrees against the driving signal, the vibration of the acceleration detecting element 101 in the resonant frequency is kept. Thus, a phase shift component obtained in the demodulation part 432 is given as a control input of the frequency controlling part 433.

In the frequency controlling part 433, in a case in which the resonant frequency of the vibration system of the detecting proof mass and beam 105 is higher than the resonant frequency of the driving signal based on the input phase information, the resonant frequency of the vibration system of the detecting proof mass and beam 105 is decreased by increasing a DC voltage component applied to the resonant frequency tuning electrode 108. In an opposite case, the resonant frequency is increased by decreasing the DC voltage component applied to the resonant frequency tuning electrode 108. In this way, it is controlled such that the frequency of the driving signal of the detecting proof mass and beam 105 is matched with the frequency of the signal output from the common VCO 419 which is common to that of the detecting circuit of the angular velocity detecting element 111.

The DC voltage component applied to the resonant frequency tuning electrode 108 is applied by the DAC part 436. Namely, the DC voltage component which changes the resonant frequency to cancel a change of the resonant frequency of the detecting proof mass and beam 105 is applied to the resonant frequency tuning electrode 108 from the DAC part 436. Here, the application of the DC voltage component may not be necessarily the DC voltage but ΣΔ type DAC in which a direct current is given in average by a pulse frequency or the like. The signal application according to a pulse width can simplify the configuration of the DAC part 436 and easily obtain high accuracy because the accuracy is defined by a time resolution.

Further, the DC voltage component given to the resonant frequency tuning electrode 108 indirectly denotes the applied acceleration, and this control output is output to the outside as the output of the acceleration sensor. Here, in the signal tuning part 435, it is generally output to the outside of the sensor after a zero point correction, a sensitivity correction or a correction of those changes (temperature characteristics) due to a temperature is performed.

Further, in the demodulation part 432, the amplitude of the vibration of the detecting proof mass and beam 105 is obtained by multiplying the detecting signal having the same phase as the monitoring signal with the monitoring signal. The amplitude information is input to the amplitude controlling part 434 and present amplitude obtained from the amplitude component of the monitoring signal is compared with a predetermined target amplitude, and a control that in a case in which the present amplitude is less than the target amplitude, gain of the amplifier 425 is increased, and in an opposite case, the gain of the amplifier 425 is decreased is performed.

In the detecting principle according to the present embodiment, to keep the driving amplitude constant is not an indispensable condition in the acceleration detection. However, for keeping the ratio of signal to noise (SNR, Signal-to-Noise Ratio) and diagnosing a failure described below, it is important to keep the driving amplitude constant, and therefore the amplitude controlling part 434 is installed in the present embodiment, and a constant amplitude control is adopted.

Effects of the Embodiment 1

As described above, in the present embodiment, the application of the acceleration is detected from the change of the resonant frequency of the resonator, and the control in which the resonant frequency is kept constant by the spring softening effect is performed. This configuration achieves the following advantageous effects.

For example, contrary to the present embodiment, a conventional inertial sensor disclosed in PTL 1 is as below. Namely, in the conventional inertial sensor provided with an angular velocity detecting element and an acceleration detecting element which uses a principle of detecting acceleration by static displacement, cavities (chambers) are independently formed, and the angular velocity detecting element is vacuum sealed while the acceleration detecting element is sealed at the atmospheric pressure. In such a conventional inertial sensor, in order to form the cavities independently, a step of forming a cavity dividing part which divides the respective cavities, and a step of sealing the respective cavities at different sealing pressures are necessary.

However, in the inertial sensor according to the present embodiment, the acceleration detecting element 101 and the angular velocity detecting element 111 are arranged and vacuum sealed in one cavity 121 at a certain pressure, and this configuration eliminates the need for forming the cavities independently. With this, in the present embodiment, the step of forming the cavity dividing part which divides the respective cavities, and the step of sealing the respective cavities at the different sealing pressures such as in the conventional one can be omitted.

Further, frequency responses of the respective detecting elements in the inertial sensor are described as below. For example, in the conventional inertial sensor, acceleration detection by using the acceleration detecting element using the principle of detecting the acceleration by the static displacement uses a low frequency band, while angular velocity detection by using the angular velocity detecting element uses a high frequency band.

Figure 6:
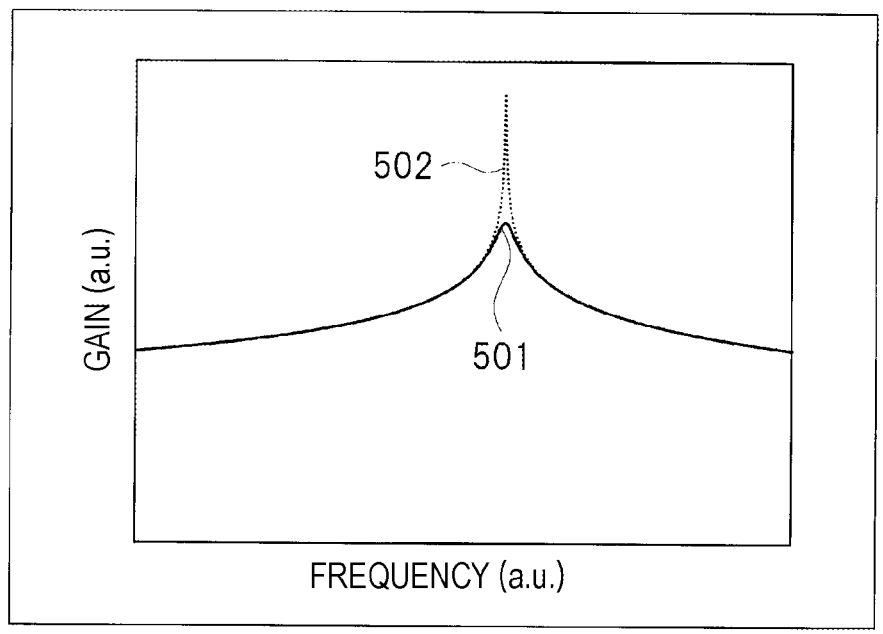
FIG. 6 is a diagram illustrating one example of a frequency response of the acceleration detecting element and a frequency response of the angular velocity detecting element in the inertial sensor according to the embodiment 1 of the present invention.

However, in the inertial sensor according to the present embodiment, the frequency response is shown in FIG. 6. FIG. 6 is a diagram (horizontal axis denotes frequency and vertical axis denotes gain) illustrating one example of the frequency response of the acceleration detecting element 101 and the frequency response of the angular velocity detecting element 111 in the inertial sensor according to the present embodiment.

In FIG. 6, a frequency response 501 depicts a frequency response of the acceleration detecting element 101 using the principle of detecting the acceleration by the control in which the resonant frequency of the resonator is kept constant, and a frequency response 502 depicts a frequency response of the angular velocity detecting element 111.

According to FIG. 6, in the present embodiment, since a signal and a peak of each of the acceleration and the angular velocity are located within the same frequency band, the same or a similar design of each of a frequency response of the analogue circuit of the detecting circuit and a frequency response of the ADC part can be used in each of the detecting circuit of the acceleration and the detecting circuit of the angular velocity, and therefore a design cost can be reduced.

Further, in view of reliability of the inertial sensor, using the same frequency band for the acceleration and the angular velocity is useful because the common analogue detecting circuit can be used. For example, in a case in which failure in a detecting axis (including detecting direction and detecting target) having a higher priority occurs, a circuit path may be switched by an analogue switch such that a detecting circuit for a detecting axis having a lower priority is operated as the detecting circuit for the detecting axis having the higher priority. Further, a plurality of redundant circuits may be provided in advance, and in case of failure of the detecting circuit, the redundant circuit may be operated as a backup of the failed detecting circuit regardless of whether the detecting target is the angular velocity or the acceleration.

Further, in compositing with the angular velocity sensor, the oscillator arranged in the detecting circuit of the angular velocity detecting element 111 may be also used as the oscillator of the detecting circuit of the acceleration detecting element 101, and this configuration can reduce a cost in the whole of the detecting circuit.

Further, in the present embodiment, since the angular velocity detecting element 111 and the acceleration detecting element 101 have substantially the same resonant frequency and are arranged in the same vacuum cavity 121, the failure can be detected with each other.

Figure 7:
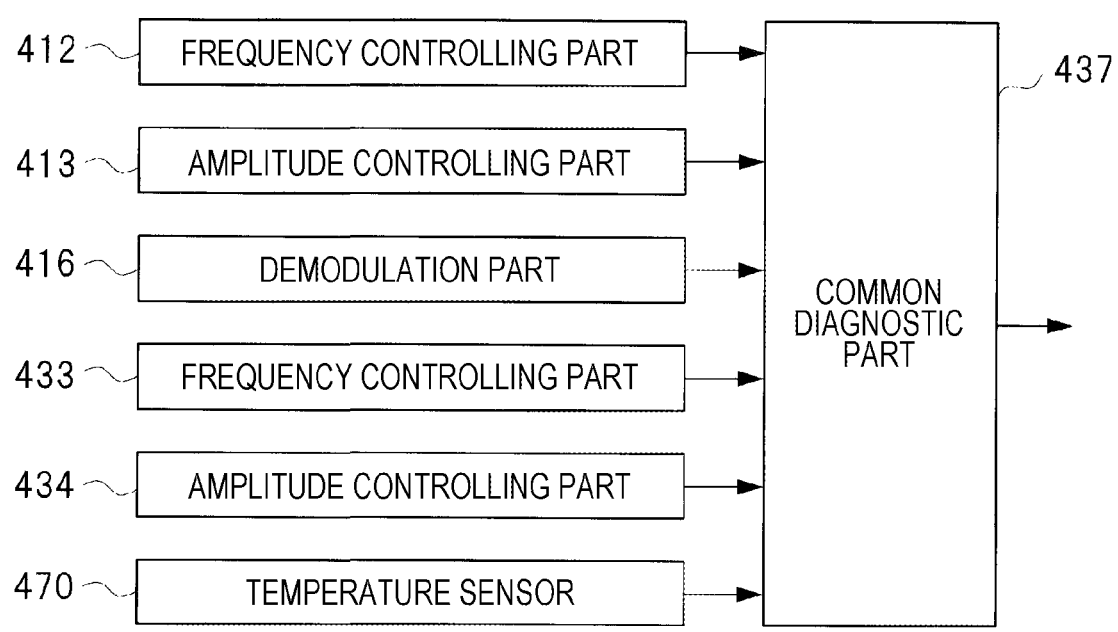
FIG. 7 is a block diagram illustrating one example of diagnostic function of a common diagnostic part in the inertial sensor according to the embodiment 1 of the present invention.

FIG. 7 is a block diagram illustrating one example of diagnostic function (diagnostic circuit) of the common diagnostic part 437 in the inertial sensor according to the present embodiment. As shown in FIG. 7, in the present embodiment, output of the frequency controlling part 412, output of the amplitude controlling part 413, and output of the demodulation part 416 of a detecting side are input to the common diagnostic part 437 from the detecting circuit of the angular velocity detecting element 111. Further, output of the frequency controlling part 433 and output of the amplitude controlling part 434 are input to the common diagnostic part 437 from the detecting circuit of the acceleration detecting element 101. Further, output of a temperature sensor 470 arranged on the integrated circuit is input to the common diagnostic part 437.

Here, the output (F_gyro) of the frequency controlling part 412 is a command value to match the output of the common VCO 419 of the inertial sensor with the driving side resonant frequency of the angular velocity detecting element 111 at the temperature output from the temperature sensor 470. On the other hand, the output (F_accel) of the frequency controlling part 433 is a command value to match the resonant frequency of the acceleration detecting element 101 with the driving side resonant frequency of the angular velocity detecting element 111 at the temperature output from the temperature sensor 470.

By using this characteristic, the failure can be detected from changes of the values of F_gyro and F_accel. For example, largely changes of the both values of F_gyro and F_accel after shipping means failure of a common circuit such as the common VCO 419, and therefore all operations of the inertial sensor are stopped. Further, a change of only the value of F_accel means failure of only the circuit relating to the acceleration sensor, and therefore the output of the angular velocity sensor is maintained. Such a failure mode occurs when mass of the detecting proof mass is changed due to, for example, adhering of a foreign substance to the detecting proof mass. The resonant frequency (frequency) of the vibration system is defined by $\omega=\sqrt{(k/m)}$ and therefore a change of mass appears as a change of the resonant frequency. Here, $\omega$ denotes an angular frequency, k denotes a spring constant, and m denotes mass of the detecting proof mass.

Further, when the change of one of the values of F_gyro and F_accel exceeds a change rate (defined by Young's Modulus) in accordance with a change of the temperature obtained by the temperature sensor 470, failure in a temperature characteristic of the corresponding angular velocity sensor or acceleration sensor occurs and therefore the output of the corresponding sensor is stopped. Further, when both values of F_gyro and F_accel are changed contradictorily to the measuring result of the temperature sensor 470, it is diagnosed that failure of the temperature sensor 470 occurs.

As described above, since the change of the resonant frequency follows the failure mode, the circumferential temperature or the like, by combining the values of F_gyro and F_accel which are the output of a plurality of the frequency controlling parts 412, 433, the failure mode or the failure point, where the conventional single sensor cannot detect, can be detected.

Further, similarly, the output (A_gyro) of the amplitude controlling part 413 is a command value to determine voltage for vibrating the angular velocity detecting element 111 in the driving direction at the temperature output from the temperature sensor 470. On the other hand, the output (A_accel) of the amplitude controlling part 434 is a command value to determine the driving signal for keeping the amplitude the vibration of the acceleration detecting element 101 at predetermined amplitude at the temperature output from the temperature sensor 470.

Similarly, by using this characteristic, the failure of each function can be detected from changes of the values of A_gyro and A_accel. For example, largely changes of the both values of A_gyro and A_accel at the same time means failure of reference voltage or common cavity 121, and therefore all operations of the inertial sensor are stopped. Further, a change of only the value of A_accel means failure of only the circuit relating to the acceleration sensor, for example failure of the DAC part 436 which generates the driving signal, and therefore the output of the acceleration sensor is stopped while keeping the output of the angular velocity sensor.

Further, although the cavity 121 is a vacuum, Q value of the resonator is changed in accordance with the temperature, and therefore when the change of one of the values of A_gyro and A_accel exceeds a change rate (defined by temperature-Q value characteristic) in accordance with a change of the temperature obtained by the temperature sensor 470, the output of the corresponding sensor is stopped. Further, when both values of A_gyro and A_accel are changed contradictorily to the measuring result of the temperature sensor 470, it is diagnosed that failure of the temperature sensor 470 occurs.

Further, the diagnostic function (diagnostic circuit) described above is provided based on a function which monitors each of the frequency control output and each of the amplitude control output of each of the detecting circuit of the acceleration detecting element 101 and the detecting circuit of the angular velocity detecting element 111, and diagnoses each function based on a predetermined threshold, and therefore the diagnostic function does not prevent the diagnosis in each detecting axis or by only its own function.

According to the inertial sensor according to the present embodiment described above, by vacuum sealing the acceleration detecting element 101 and the angular velocity detecting element 111 at the same pressure and by using the resonance vibration of the MEMS device having the high Q value, a highly stable inertial sensor with a simple configuration can be manufactured. Especially, the acceleration detecting element 101 can detect the acceleration stably in a vacuum without deteriorating its vibration resistant property.

Embodiment 2

An inertial sensor provided with an acceleration sensor and an angular velocity sensor according to an embodiment 2 is described with reference to FIGS. 8 to 10. The embodiment 2 is an example of a configuration of the inertial sensor which seals at least one angular velocity detecting element and at least two acceleration detecting elements in the only one cavity (chamber).

Figure 8:
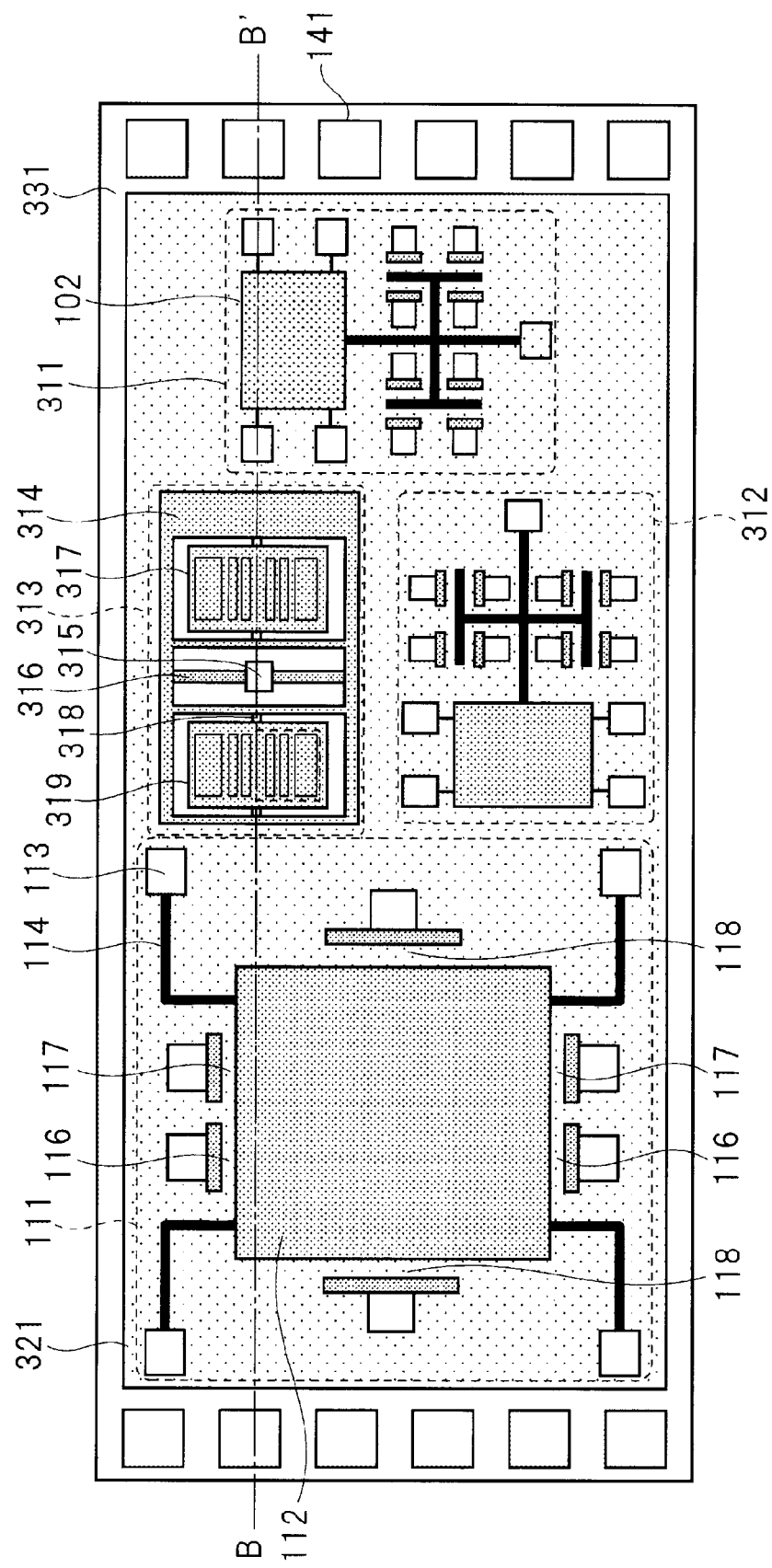
FIG. 8 is a plane view illustrating one example of a configuration of a detecting element of an inertial sensor according to an embodiment 2 of the present invention.

FIG. 8 is a plane view of one example of a configuration of the detecting element of the inertial sensor according to the embodiment 2. In the inertial sensor according to the embodiment 2, as one example, a configuration example of the inertial sensor in which acceleration in three axial directions or acceleration detecting elements 311, 312, 313, and angular velocity in one axial direction or the angular velocity detecting element 111 are vacuum sealed in one cavity 321 in one chip 331 is provided. The angular velocity detecting element 111 is similar to that in the embodiment 1, and therefore the detailed description thereof is omitted.

In the embodiment 2, as the acceleration detecting element having three different detecting axial directions, the acceleration detecting element 311, the acceleration detecting element 312, the acceleration detecting element 313 are provided.

Here, the acceleration detecting element 311 and the acceleration detecting element 312 are formed to detect acceleration by the detection principle described in the embodiment 1, and therefore the detailed description thereof is omitted. Further, as shown in FIG. 8, the acceleration detecting element 312 is formed by rotating the acceleration detecting element 311 by 90 degrees and is formed to detect acceleration in a lateral direction of FIG. 8. A detecting direction of the acceleration detecting element 311 is a vertical direction of FIG. 8.

The acceleration detecting element 313 detects acceleration in a depth direction (out-of-plane direction) of FIG. 8. The acceleration detecting element 313 has a first out-of-plane detecting proof mass 314, a fixed part 315, a rotation beam 316, a second out-of-plane detecting proof mass 317, a rotation beam 318, and a fixed electrode 319.

The first out-of-plane detecting proof mass 314 is a seesaw type detecting proof mass supported from the fixed part 315 via the rotation beam 316. The second out-of-plane detecting proof mass 317 is a detecting proof mass which makes a seesaw like movement in the out-of-plane direction and is supported from the first out-of-plane detecting proof mass 314 via the rotation beam 318. Two second out-of-plane detecting proof masses 317 are symmetrically arranged with respect to the rotation beam 316.

Figure 9:
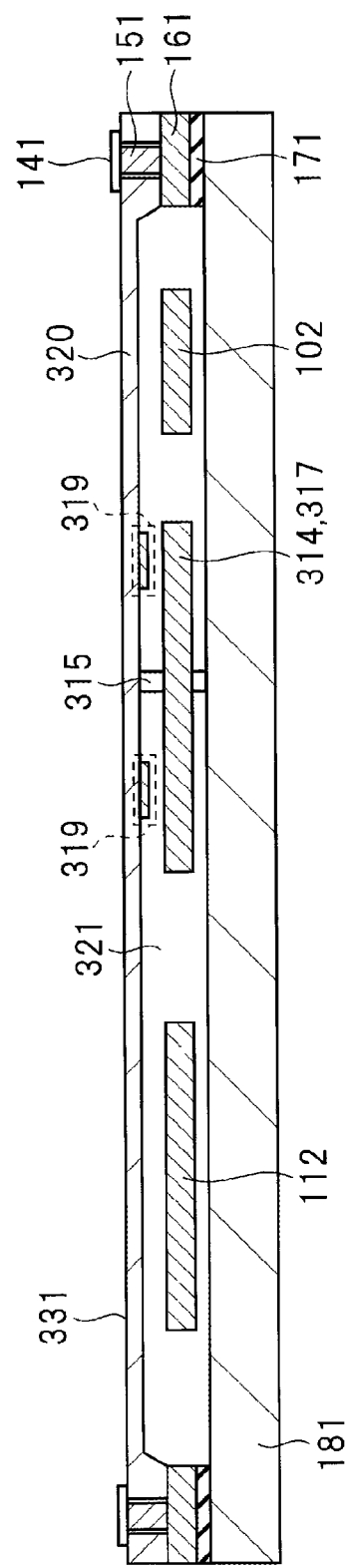
FIG. 9 is a cross-sectional view illustrating the one example of the configuration of the detecting element of the inertial sensor shown in FIG. 8.

FIG. 9 is a cross-sectional view illustrating one example of a configuration of the detecting element of the inertial sensor shown in FIG. 8. FIG. 9 illustrates a cross section of the chip 331 taken by a part (B-B' line) of the proof mass 102 of the acceleration detecting element 311, the out-of-plane detecting proof masses 314, 317 of the acceleration detecting element 313, and the detecting proof mass 112 of the angular velocity detecting element 111 in FIG. 8.

The chip 331 is provided with the handle layer 181, the insulation layer 171, the device layer 161, and a cap layer 320. The fixed electrode 319 for forming an electrode between the second out-of-plane detecting proof mass 317 and the cap layer 320 forming the only one cavity 321 is arranged on the cap layer 320. Here, the fixed electrode 319 is formed by a method in which an electric separation is provided by embedding the insulation layer in the cap layer 320 formed by doped silicon or a method in which a metal electrode is formed in the cap layer 320 formed by glass.

In the acceleration detecting element 313, a driving electrode, a monitoring electrode, and a resonant frequency tuning electrode are arranged on the fixed electrode 319 (detailed arrangement is not shown).

Here, in a steady state in which the acceleration is not applied, a predetermined DC voltage is applied to all the resonant frequency tuning electrodes. In this state, when the acceleration is applied in the out-of-plane direction, the first out-of-plane detecting proof mass 314 is displaced while rotating, and in the resonant frequency tuning electrode to be close to the cap layer 320 in the second out-of-plane detecting proof mass 317, the capacitance is increased (spring softening effect is strengthened), and the resonant frequency of the second out-of-plane detecting proof mass 317 is decreased. On the other hand, in the resonant frequency tuning electrode to be away from the cap layer 320 in the second out-of-plane detecting proof mass 317, the capacitance is decreased (spring softening effect is weakened), and the resonant frequency of the second out-of-plane detecting proof mass 317 is increased.

Based on the change of these resonant frequencies, similarly to the detecting circuit of the acceleration detecting element shown in the embodiment 1, by controlling the voltage of the resonant frequency tuning electrode and the spring softening effect, the resonant frequency of the second out-of-plane detecting proof mass 317 is kept constant. On the other hand, a control amount of the spring softening effect indirectly denotes the acceleration applied to the first out-of-plane detecting proof mass 314, and therefore the value is output as an acceleration output in the out-of-plane direction.

The operation of the acceleration detecting element 313 in the out-of-plane direction according to the embodiment 2 and its detecting circuit is described above.

In the embodiment 2, three axes or three acceleration detecting elements 311, 312, 313 are provided, and voltage of the resonant frequency tuning electrode which causes the spring softening effect is defined in advance such that the resonant frequencies of the acceleration detecting elements 311, 312, 313 keep the uniform resonant frequency in the steady state.

Specifically, the voltage of the resonant frequency tuning electrode of the acceleration detecting elements 311, 312, 313 is controlled such that the resonant frequency of the acceleration detecting elements 311, 312, 313 are matched with the resonant frequency of the angular velocity detecting element 111 in the driving direction. With such a configuration, as described in the embodiment 1, since the oscillation signal generated by the common VCO 419 can be used as the oscillation signal of all the detecting elements, it is enough to provide only one oscillation circuit in the whole sensor and therefore a merit of the cost can be obtained.

Further, although it is not shown, a plurality of the angular velocity detecting elements 111 may be arranged in the only one cavity 321 to achieve a configuration of detecting the angular velocities in a plurality of axial directions. For example, in a case in which two angular velocity detecting elements of the first angular velocity detecting element and the second angular velocity detecting element are provided, for example, by using the frequency of the driving signal of the second angular velocity detecting element for the resonant frequency of the first angular velocity detecting element in the driving direction, the angular velocities in a plurality of the axial directions can be detected without having a plurality of the oscillation circuits. Here, the second angular velocity detecting element is not necessarily driven in the resonant frequency in its driving direction.

On the other hand, the resonant frequency of a plurality of the acceleration detecting elements may be matched with the resonant frequency of an outside resonator having a Q value higher than the Q value of the acceleration detecting element, or N times multiplied or N times divided frequency thereof. With this, although a cost for the outside resonator (crystal oscillator) is necessary, stability of the acceleration sensor can be improved by using stability in frequency of the resonator having the extremely high Q value.

Figure 10:
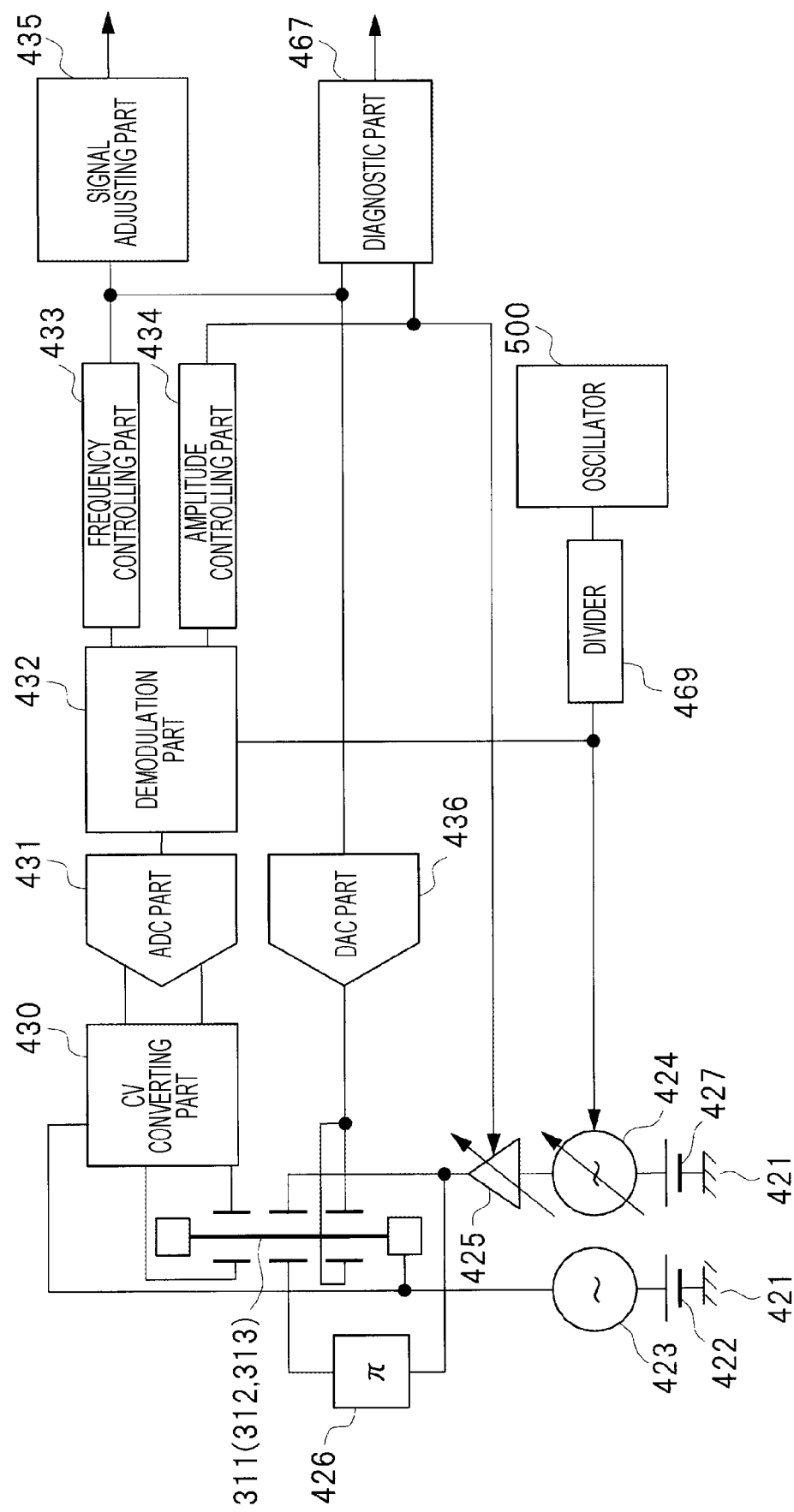
FIG. 10 is a block diagram illustrating one example of a configuration of a detecting circuit of an acceleration detecting element in the inertial sensor according to the embodiment 2 of the present invention.

FIG. 10 is a block diagram illustrating one example of a configuration of the detecting circuit of the acceleration detecting element 311 (a configuration of the acceleration detecting elements 312, 313 are similar) in which an outside oscillator 500 is used. Differences from the configuration shown in FIG. 5 are that it is controlled such that voltage of the resonant frequency tuning electrode which causes the spring softening effect is matched with a frequency component of a divided or multiplied frequency of the outside oscillator 500 by a divider 469, and a diagnostic part 467 which performs a diagnosis of failure is independent from a failure diagnostic part of the angular velocity detecting element.

Here, in the embodiment 2, since the voltage of the resonant frequency tuning electrode controls the resonant frequency of the acceleration detecting element based on the highly stable oscillation frequency obtained from the outside oscillator 500, the function of detecting failure by at least two acceleration detecting elements can be still used. Namely, in the diagnostic part 467, the failure can be diagnosed based on contradiction of the output from the frequency controlling part 433 between the acceleration detecting elements or the output from the amplitude controlling part 434.

According to the inertial sensor according to the embodiment 2 as described above, by vacuum sealing the acceleration detecting elements 311, 312, 313 and the angular velocity detecting element 111 at the same pressure, and by using the resonance vibration of the outside oscillator 500 having the extremely high Q value, the highly stable inertial sensor with the simple configuration can be provided.

As described above, the invention completed by the present inventors is described in detail based on the embodiments, however the present invention is not limited to the embodiments described above, and various modification can be adopted within the scope of the present invention.

For example, the present invention is useful to provide an inertial sensor which measures an inertial quantity such as acceleration and angular velocity or a multi axes acceleration sensor which detects acceleration in multi axial directions at a low cost and high accuracy. Further, in the failure diagnosis, since detection possibility of the failure is high, it is preferable to apply to an application to which high reliability is required such as in a vehicle mounted field.

Further, the present invention can be also applied to an inertial sensor which seals only the acceleration detecting element in one cavity in one chip, and in this case, the number of the acceleration detecting elements is not limited one, and the present invention can be applied to a configuration having more than two acceleration detecting elements. Further, the present invention can be also applied to an inertial sensor which seals more than two acceleration detecting elements and more than two angular velocity detecting elements in one cavity in one chip, and the number of detecting elements is not limited. Further, the present invention can composite the acceleration detecting element with other physical quantity detecting element.

REFERENCE SIGNS LIST

105 detecting proof mass and beam
106 driving electrode
108 resonant frequency tuning electrode
430 CV converting part
431 ADC part
432 demodulation part
433 frequency controlling part
435 signal adjusting part
436 DAC part

The invention claimed is:
1. An inertial sensor comprising:
   at least two first resonators which detects acceleration;
   at least two second resonators which detect angular velocity;
   a capacitive first electrode which excites the at least two first resonators;
   a capacitive second electrode which changes a resonant frequency of the at least two first resonators;
   a detecting circuit which applies a first voltage to the second electrode to change the resonant frequency such that a change of the resonant frequency of the at least two first resonators are canceled when the acceleration is applied to the at least two first resonators during a vibration of the at least two first resonators due to application of the first voltage to the at least two first resonators,
   the detecting circuit applies a second voltage to the second electrode, which decreases a spring constant of the first resonator, and
   the detecting circuit outputs the acceleration based on a value of the first voltage applied to the second electrode; and
   a diagnostic circuit which diagnoses failure based on comparison of resonant frequencies between the at least two first resonators before acceleration is applied and the at least two second resonators.
2. The inertial sensor according to claim 1, wherein the second voltage is a bias voltage which changes the resonant frequency of the at least two first resonators and the bias voltage is applied in advance to the second electrode in a steady state in which the acceleration is not applied to the at least two first resonators, and
   the resonant frequency of the at least two first resonators in the steady state are to be a resonant frequency lower than that in a state in which the bias voltage is not applied.
3. The inertial sensor according to claim 1, wherein before acceleration is applied the detecting circuit controls the first voltage applied to the second electrode such that the resonant frequency of the at least two first resonators which detects the acceleration is matched with the resonant frequency of the at least two second resonators which detects the angular velocity.
4. The inertial sensor according to claim 2, wherein before the acceleration is applied the at least two first resonators which detects the acceleration are arranged,
   a plurality of the first electrodes, a plurality of the second electrodes, and a plurality of the detecting circuits are arranged to correspond to the at least two first resonators, and
   each of the detecting circuits controls the first voltage applied to a plurality of second electrodes such that the resonant frequency of the at least two first resonators which detects the acceleration is to be the same frequency as the at least two second resonators.
5. The inertial sensor according to claim 4, further comprising the at least two second resonators which detects angular velocity,
   wherein before the acceleration is applied each of the detecting circuit controls the first voltage applied to the second electrode such that the resonant frequency of the at least two first resonators which detects the acceleration is matched with the resonant frequency of the at least two second resonators which detects the angular velocity.
6. The inertial sensor according to claim 4, further comprising the at least two second resonators which detects the angular velocity,
   wherein before the acceleration is applied each of the detecting circuits controls the first voltage applied to the second electrode such that the resonant frequency of the at least two first resonators which detects the acceleration are matched with the resonant frequency of one of the at least two second resonators which detect the angular velocity.
7. The inertial sensor according to claim 4, wherein before the acceleration is applied, each of the detecting circuits compares the resonant frequency of the at least two first resonators which detects the acceleration with the resonant frequency of an outside resonator having a higher Q value than a Q value of the at least two first resonators, and controls such that the resonant frequency of the at least two first resonators are matched to the resonant frequency of the outside resonator having the high Q value.
8. The inertial sensor according to claim 1, comprising the at least two first resonators which detects the acceleration,
   the at least two second resonators which detects the angular velocity, and
   one oscillation circuit which generates a clock signal which excites the at least two first resonators and the at least two second resonators.
9. The inertial sensor according to claim 1, wherein the diagnostic circuit diagnoses the failure based on comparison of the first voltage which excites the at least two first resonators and the at least two second resonators at a predetermined amplitude, or amplitude obtained during the vibration of the at least two first resonators by a predetermined voltage.
10. The inertial sensor according to claim 9, wherein the diagnostic circuit diagnoses the failure based on the comparison of the resonant frequency of the at least two first resistors and the at least two second resistors based on a change of temperature obtained by a temperature sensor arranged on an integrated circuit of the inertial sensor.

* * * * *